United States Patent
Full et al.

(10) Patent No.: US 6,167,991 B1
(45) Date of Patent: Jan. 2, 2001

(54) METHOD AND APPARATUS FOR DETECTING POSITION OF AN ELEVATOR DOOR

(75) Inventors: Gary Full; Richard Pustelniak, both of Tucson, AZ (US)

(73) Assignee: Otis Elevator Company, Farmington, CT (US)

( * ) Notice: Under 35 U.S.C. 154(b), the term of this patent shall be extended for 0 days.

(21) Appl. No.: 09/514,918

(22) Filed: Feb. 28, 2000

(51) Int. Cl.[7] ................................................ B66B 13/26
(52) U.S. Cl. ................................ 187/317; 187/393; 49/25
(58) Field of Search .......................... 127/317, 391–393; 49/26–28, 138, 25; 160/291, 292, 293.1; 318/280, 282, 283, 286, 466–470, 480

(56) References Cited

U.S. PATENT DOCUMENTS

| | | | |
|---|---|---|---|
| 4,029,176 | 6/1977 | Mills | 187/52 R |
| 4,577,437 | * 3/1986 | Gionet et al. | 49/25 |
| 4,888,532 | * 12/1989 | Jossen | 318/480 |
| 5,149,921 | * 9/1992 | Picado | 187/130 |
| 5,420,430 | * 5/1995 | Trett | 187/317 |
| 5,581,944 | * 12/1996 | Kornbrekke et al. | 49/28 |
| 5,696,362 | * 12/1997 | Amend | 187/317 |
| 5,698,824 | * 12/1997 | Platt | 187/317 |
| 5,886,307 | * 3/1999 | Full et al. | 187/393 |
| 5,900,598 | * 5/1999 | Cottle et al. | 187/317 |
| 5,925,858 | * 7/1999 | Full et al. | 187/317 |
| 6,051,829 | * 4/2000 | Full | 49/25 |

FOREIGN PATENT DOCUMENTS

| | | |
|---|---|---|
| 0 699 619 A2 | 3/1996 | (EP) . |
| 9-237578 | 9/1997 | (JP) . |

* cited by examiner

*Primary Examiner*—Jonathan Salata

(57) ABSTRACT

A method and apparatus for detecting the distance between opposing sides of an elevator door system is presented. The invention enhances the ability of an elevator door safety system to discriminate between false targets and true obstructions. The method detects distance between a first plurality of emitters and a first plurality of receivers mounted on the opposing sides of the elevator door system. The method comprises emitting an energy beam from an emitter. A halo component of the energy beam, having a predetermined wide angle, is sampled with the plurality of receivers to provide a set of energy signals indicative of intensity of the halo component energy sampled. From the set of energy signals, a vertical distance from the center of the pattern to an intersection of the halo component with the first plurality of receivers is determined. The distance between the first plurality of emitters and receivers is then calculated utilizing the predetermined wide angle and the vertical distance.

20 Claims, 4 Drawing Sheets

METHOD AND APPARATUS FOR DETECTING POSITION OF AN ELEVATOR DOOR

TECHNICAL FIELD

The present invention relates to elevators and, more particularly, to a method and apparatus for detecting distance between emitters and receivers mounted on opposing sides of an elevator door system.

BACKGROUND OF THE INVENTION

In elevator installations, many elevator door systems are equipped with safety systems designed to detect potential interference with the closing operation of the doors of the elevator cab, i.e., the elevator doors. Such safety systems typically include a plurality of signal emitter sources disposed on one elevator door, and a plurality of signal receiver sources disposed on the other elevator door. The signal emitters emit a curtain of signals across the threshold of the elevator door which are received by the signal receivers. When the curtain of signals is interrupted, the safety system communicates with a door controller in order to either stop the door closing operation and open the doors, or to maintain the doors in an opened position, depending on the current door position.

Several prior art doorway safety systems create a zone of detection which extends into the entryway. One such doorway safety system is described in U.S. Pat. No. 4,029,176 (Mills) that utilizes acoustic wave emitters and receivers to detect objects or persons within an area near the elevator doors, i.e., within a zone of detection. The emitters send out a signal at an angle into the entryway. When an obstruction enters the detection zone, the signal reflects from the obstruction and is detected by the receivers.

Another alternative doorway safety system described in U.S. Pat. No. 5,886,307 (Full, et al.) also discloses a three-dimensional system for detecting objects across the threshold and in the entryway. This system projects a curtain of light beams across the threshold and illuminates the area directly in front of the entryway with three-dimensional detection beams. The system detects obstructions between the elevator doors and across the threshold if an obstruction breaks one or more of the beams. In addition, if energy from the three-dimensional beams reflects off of an object in the entryway into the three-dimensional receivers, the obstruction is also detected.

One shortcoming of the existing prior art safety systems is detection of objects after the elevator doors have been partially closed. As the elevator doors are closing, the detection zone is also moving and structural obstructions, such as walls supporting the doors or an outside set of hallway doors, fall within the detection zone. By way of example, a center opening elevator door system typically comprises a set of hallway doors and a set of elevator cab doors with the emitters and receivers mounted on the elevator doors. Both sets of doors slide open and close together across a threshold with the hallway doors closing and opening slightly ahead and behind, respectively. However, as the hallway doors slide ahead of the elevator doors, they often extend into the changing zone of detection. Once the signal from an emitter is intercepted by a hallway door, it is reflected to the opposing hallway door, and is subsequently reflected again to be detected by the receivers.

As the elevator doors are closing and the distance between the emitters and receivers becomes progressively smaller, the signal that is reflected from the hallway doors and other architectural obstructions travels shorter distances and still remains strong when received by the receivers. The existing safety systems are not able to discriminate between the signal that is reflected from false targets (such as hallway doors) at relatively short distances between the elevator doors and a signal reflected from a true obstruction.

European Patent Application No. EP 0699619A2 (Memco Limited) describes a three dimensional system for detecting objects or persons in the entryway. Memco Limited attempts to solve the above-described problem with false targets by progressively reducing the gain of the receivers, as the elevator doors are closing. The doorway safety system described above in Full, et al. attempts to solve the problem by progressively reducing the amount and intensity of the transmitted signal as the doors are closing. A doorway safety system described in a patent U.S. patent application Ser. No. 08/1876,127, filed on Jun. 23, 1997 which is now U.S. Pat. No. 5,925,868 issued on Jul. 20, 1999 to Gary G. Full, et. al., of Otis Elevator Co. and entitled "A Safety System for Detecting Small Objects Approaching Closing Doors" attempts to solve the problem by significantly modifying the way that the emitters are driven, as well as by modifying the way that the system interprets the received signals.

Each of these methods of solving the problem are dependent upon the ability to determine actual elevator door position. Most existing safety detection systems, of the kind described above, are stand-alone systems, meaning they do not obtain elevator door position information from the door operator. These systems must determine elevator door position information independently. Since the "curtain" of signals being transmitted directly across the elevator door opening increases in intensity as the doors close, that relative intensity is used to represent elevator door position.

However, a major drawback to using curtain beam intensity to determine elevator door position is that it is extremely difficult to obtain consistent curtain intensity values, as they relate to actual door positions, from manufactured system to system, and from installation to installation. There are several factors involved which can affect curtain beam intensities, e.g., variation in optical components, individual curtain beam alignments, emitter and/or receiver unit alignments, aging of optical components (emitters, receivers, lens materials), the accumulation of dust on the lenses, and the presence of smoke or condensation.

One prior art solution to the problem of curtain beam intensity variation involves compensating for potential intensity variation by designing in a very loose tolerance requirement for door position values. Problematically, the overall effect is to significantly compromise system performance.

Another prior art solution is to calibrate each system to its particular installation by providing a manual calibration procedure whereby door positions can be directly associated with actual curtain beam intensities for the particular system in its particular installation. A limitation for this method is that the system cannot automatically compensate for component aging, dust accumulation or smoke/moisture in the environment.

A doorway safety system described in a pending patent Japanese Patent Application Serial No. 9-237578, filed on Sep. 3, 1997 to Masanori Nakamori, et. al., of Nippon Otis Elevator Co., entitled "Elevator Passenger Detection Device" attempts to solve the problem by utilizing a binary method of distance measurement. This method depends upon the simple detection of curtain beams by curtain receivers which are off axis to the curtain beam emitters.

This is a simple, binary, connect-no-connect method, where, the further off center the curtain beams are detectable, the further open the doors are considered to be. However, this method lacks sufficient resolution. This is because curtain beams typically are not binary entities. Rather, the beam intensity peaks at the center of the emission pattern and gradually diminishes in strength as angles increase from center, yielding no definitive and repetitive point in such an emission pattern to use for distance measurement.

There is a need, therefore, for an improved method of detecting the position of elevator doors to enhance the ability of elevator door safety systems to discriminate between false targets and true obstructions.

SUMMARY OF THE INVENTION

This invention offers advantages and alternatives over the prior art by providing a method and apparatus for detecting the distance between opposing sides of an elevator door system. The invention enhances the ability of an elevator door safety system to discriminate between false targets and true obstructions. Advantageously, the invention utilizes an optical method that eliminates the problems involved with detecting relative door position based on beam intensities of emitters and receivers mounted on the opposing sides.

These and other advantages are accomplished in an exemplary embodiment of the invention by providing a method of detecting distance between a first plurality of emitters and a first plurality of receivers mounted on the opposing sides of the elevator door system. The emitters emit energy beams having an emission pattern comprising a primary beam component emitted in a narrow angle from a center of the pattern and a halo component emitted in a predetermined wide angle from the center of the pattern. The method comprises emitting an energy beam from an emitter. The halo component of the energy beam is sampled with the plurality of receivers to provide a set of energy signals indicative of intensity of the halo component energy sampled. From the set of energy signals, a vertical distance from the center of the pattern to an intersection of the halo component with the first plurality of receivers is determined. The distance between the first plurality of emitters and receivers, i.e., the distance between the opposing sides of the elevator door system, is then calculated utilizing the predetermined wide angle and the vertical distance.

In an alternative exemplary embodiment of the invention, the halo component energy is sampled above and below the center of the pattern with the first plurality of receivers in order to determine a diameter of the peak halo component energy. The distance between the first plurality of emitters and receivers is then calculated using the formula:

$$h = d/2(\tan \theta)$$

where, h is the distance between the first plurality of emitters and receivers, d is the diameter of the peak energy of the halo component, and θ is the predetermined wide angle.

The above discussed and other features and advantages of the present invention will be appreciated and understood by those skilled in the art from the following detailed description and drawings.

DESCRIPTION OF THE PREFERRED EMBODIMENTS

Figure 1:
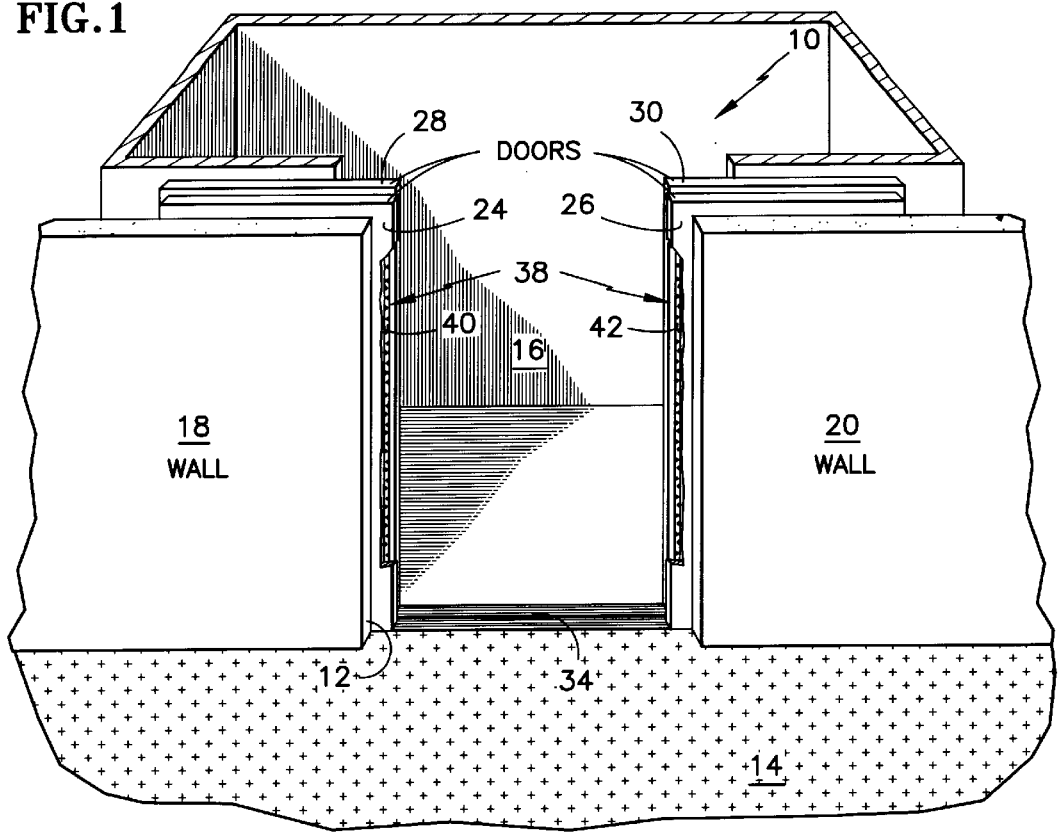
FIG. 1 is a schematic, partial front view of an elevator door safety system according to the present invention.

Referring to FIG. 1, door safety system 10 for opening and closing a doorway 12 of an elevator cab 16 is adjacent to a hallway 14 and walls 18, 20. The safety system includes a set of hallway doors 24, 26 and a set of center opening elevator cab doors 28, 30. Both sets of doors 24, 26, 28, 30 slide open and close together across a threshold 34 with the hallway doors 24, 26 closing and opening slightly ahead and behind, respectively, of the elevator cab doors 28, 30. A safety detection system 38 is installed on the elevator cab doors 28, 30 adjacent to the hallway doors 24, 26. The safety detection system 38 includes an emitter stack 40 and a receiver stack 42, each disposed on opposite sides of the doorway 12 and facing each other.

Though this embodiment describes the stacks as being mounted on a pair of center opening doors 28, 30, it will be clear to one skilled in the art that alternative mounting embodiments may be used. By way of example, the stacks may be mounted respectively on an elevator side opening door and an opposing support structure of the elevator doorway 12.

As will be discussed in further detail hereinafter, the safety detection system 38 utilizes a novel method of accurately and reliably detecting the relative distance between the elevator doors 28 and 30 as they open and close. The detection of this distance enhances the safety detection system's 38 ability to discriminate between signals that are reflected from false targets (such as the hallway doors 24 and 26) and signals reflected from a true obstruction.

Figure 2:
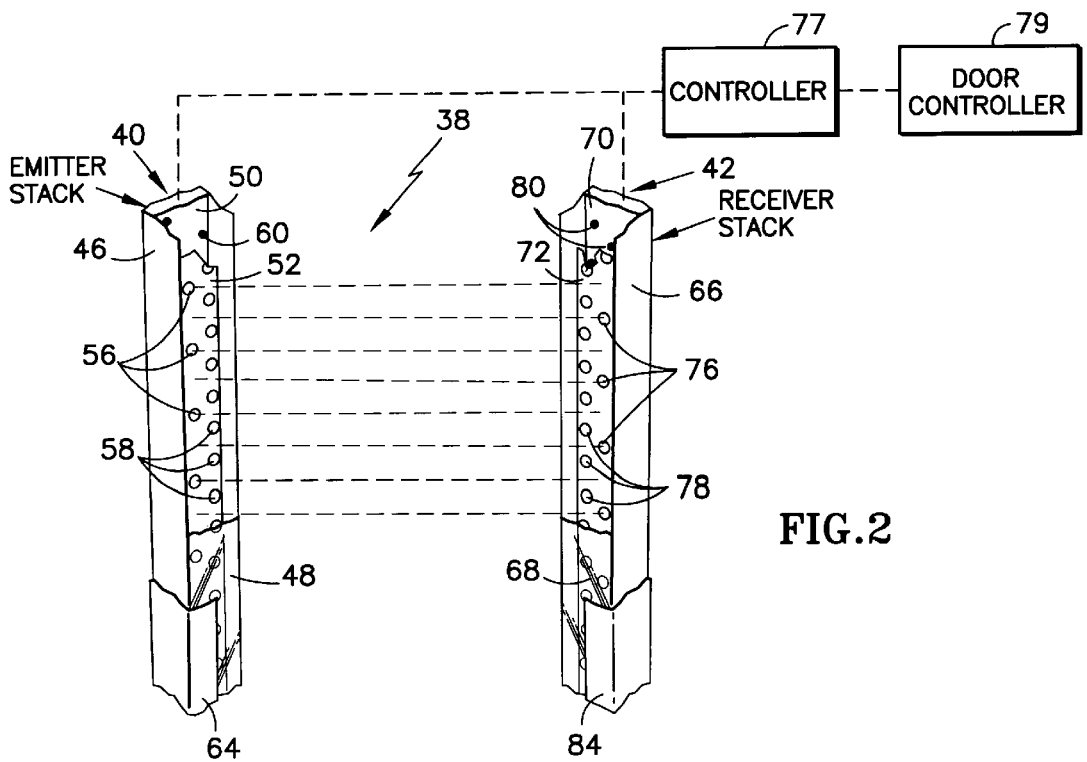
FIG. 2 is a schematic, partial view of a component of FIG. 1.

Referring to FIG. 2, each emitter stack 40 includes a housing 46 and a transparent cover 48 for protecting an emitter circuit board 50 and a emitter lens board 52. The emitter lens board 52 includes a plurality of three-dimensional emitter lenses 56 and a plurality of curtain emitter lenses 58. The emitter circuit board 50 includes a plurality of emitters, e.g., light emitting diodes (LEDs), 60 disposed adjacent to each lens 56, 58 for emitting infrared light. An emitter barrier 64 supports the housing 46 and partially blocks light for the three-dimensional emitter lenses 56.

The receiver stack 42 is structured as a mirror image of the emitter stack 40. The receiver stack 42 includes a receiver stack housing 66 having a transparent receiver stack cover 68 for protecting a receiver circuit board 70 and a receiver lens board 72. The receiver lens board 72 includes a plurality of three-dimensional receiver lenses 76 and a plurality of curtain receiver lenses 78. The curtain receiver lenses 78 are disposed directly across from the curtain emitter lenses 56. The receiver circuit board 70 includes a plurality of receivers, e.g., photodiodes, 80 adjacent to each lens 76, 78 for detecting reflected light. A receiver barrier 84 supports the receiver housing 66 and partially blocks light for the three-dimensional receiver lenses 76.

The safety system 38 includes a controller 77 that provides and controls power to the stacks 40, 42, sequences and controls the signals to the stacks 40, 42, and communicates with a door controller 79. The controller 77 contains data acquisition and data processing circuitry, including a power supply, analog to digital converter, and microprocessor. The microprocessor, e.g., the model 68HC11 from Motorola, or other such commercially available microprocessors, further includes programmable memory for defining an executable program to detect distance between the elevator doors 28 and 30.

In operation, the safety system 38 prevents the elevator cab doors 28, 30 from closing if an object or person is detected either across the threshold 34 or approaching the doorway 12. The curtain emitter lenses 58 emit a signal across the threshold 34 to the curtain receiver lenses 78. If the curtain signal is interrupted when the doors 28, 30 are either open or closing, the safety system 38 communicates with the door controller 79 to either maintain the doors 28, 30 open or reverse the closing operation, respectively.

Figure 3:
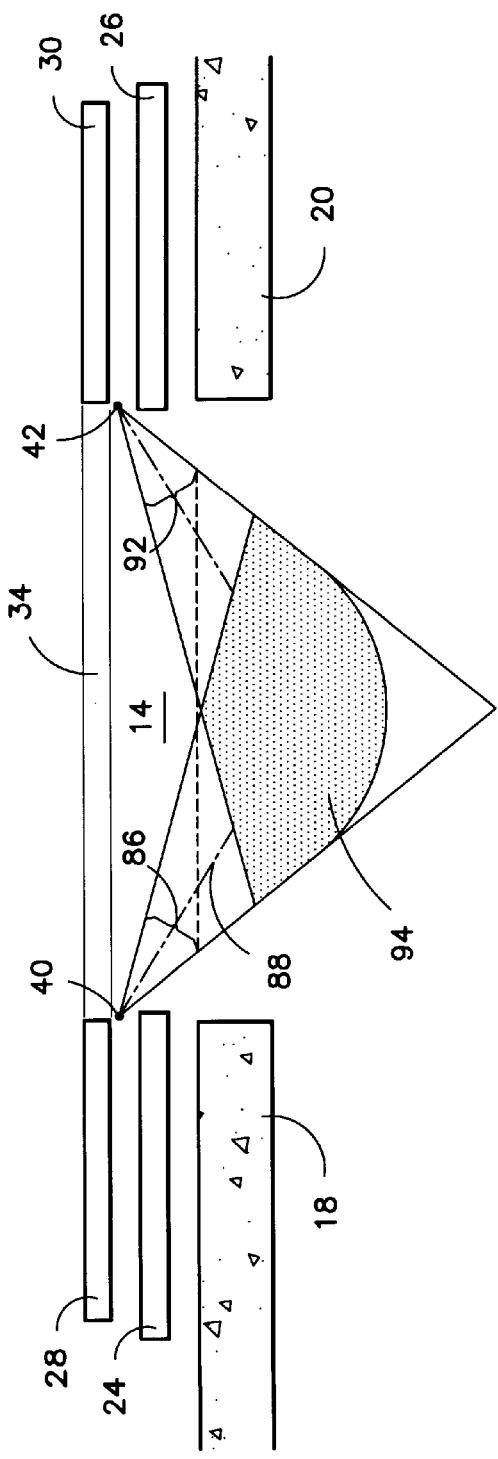
FIG. 3 is a schematic, partial view of the door system of FIG. 1.

Referring to FIG. 3, the three-dimensional emitter lenses 56 emit a three-dimensional signal at a predetermined angle outward into the hallway 14. The receivers 80 and the three-dimensional receiver lenses 76 receive a signal emitted from the three-dimensional emitter lenses 56 and reflected from an object at a predetermined angle. The intersection between the transmitting angle 86 of the three-dimensional emitter lenses 56 and the receiving angle 96 of the three-dimensional receiver lenses 76 defines a detection zone 94. When an object or a person enters the detection zone 94, a signal from the three-dimensional emitter lenses 56 hits the obstruction and is reflected into the three-dimensional receiver lenses 76. When the three-dimensional receiver lenses 76 receive a signal, the safety system 38 processes the received signal to determine if the signal represents the detection of an obstruction. If so, the safety system 38 communicates with the door controller 79 to either reverse the closing operation or maintain the doors 28, 30 open.

Figure 4:
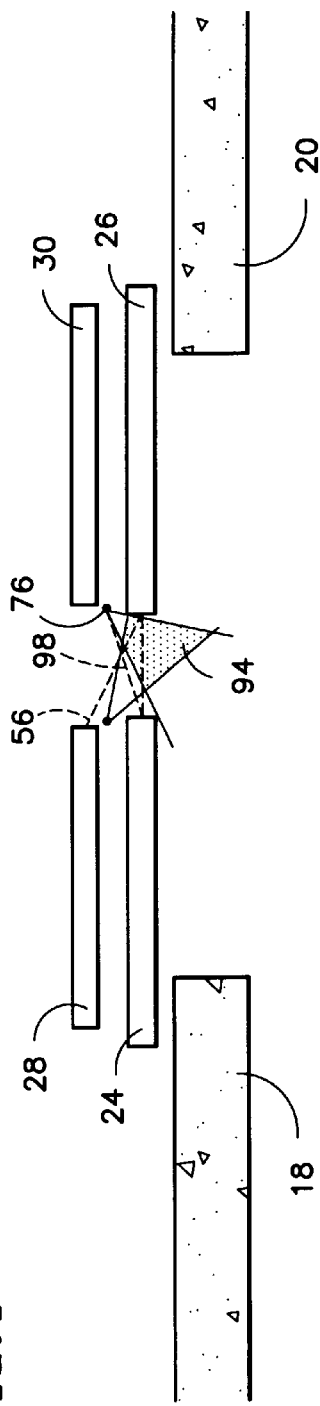
FIG. 4 is a schematic, partial view of the door system of FIG. 1.

Referring to FIG. 4, the three-dimensional detection zone 94 is modified and grows smaller as the elevator doors 28 and 30 close. Both sets of elevator doors 28, 30 and hallway doors 24, 26 slide closed together across the threshold 34. However, as the hallway doors 24, 26 slide ahead of the elevator doors 28, 30, they extend into the changing zone of detection 94. Once the signal (as indicated by dotted line 98) from a three-dimensional emitter lense 56 is intercepted by hallway door 26, it is reflected to the opposing hallway door 24. The signal 98 is subsequently reflected again to be detected by the three-dimensional receiver 76 as a false target.

As the elevator doors 28, 30 close, the scanning of the three-dimensional detection zone 94 is modified, as required, to optimize the ability to detect actual obstructions and to ignore false targets, e.g., reflections from hallway doors 24, 26. The optimization methods include varying the strength of the transmitted signal, modifying the way the transmitted signal is produced, and/or by modifying the way the received signal is interpreted.

These optimizations are performed, based on the relative distance between the elevator doors 28, 30 at any particular instant in time. As discussed herebelow, the safety system 38 utilizes a method to determine the relative distance between the elevator doors 28, 30 via optical geometry.

Figure 5:
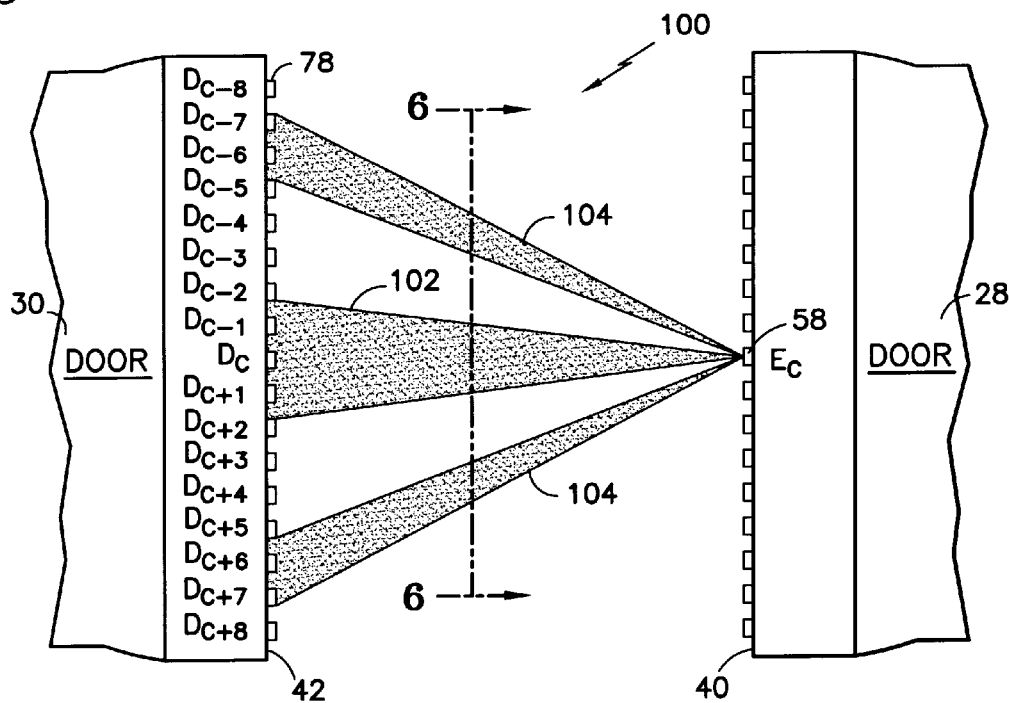
FIG. 5 is a schematic view of an energy beam of FIG. 4.

Referring to FIG. 5, each individual curtain emitter 58 emits a curtain beam 100 which originates in the emitter stack 40, and is received by a plurality of curtain beam receivers 78 in the receiver stack 42, according to a specific pattern of emission. This emission pattern is produced by the specific design of the emitter curtain lenses 58. The emission pattern for each curtain beam 100 consists of a primary beam component 102 and a secondary halo component 104. The primary beam component 102 is used for obstacle detection and for determination of relative door position, based on its intensity. The halo component 104 is used for determination of relative door position, based on optical geometry.

Figure 6:
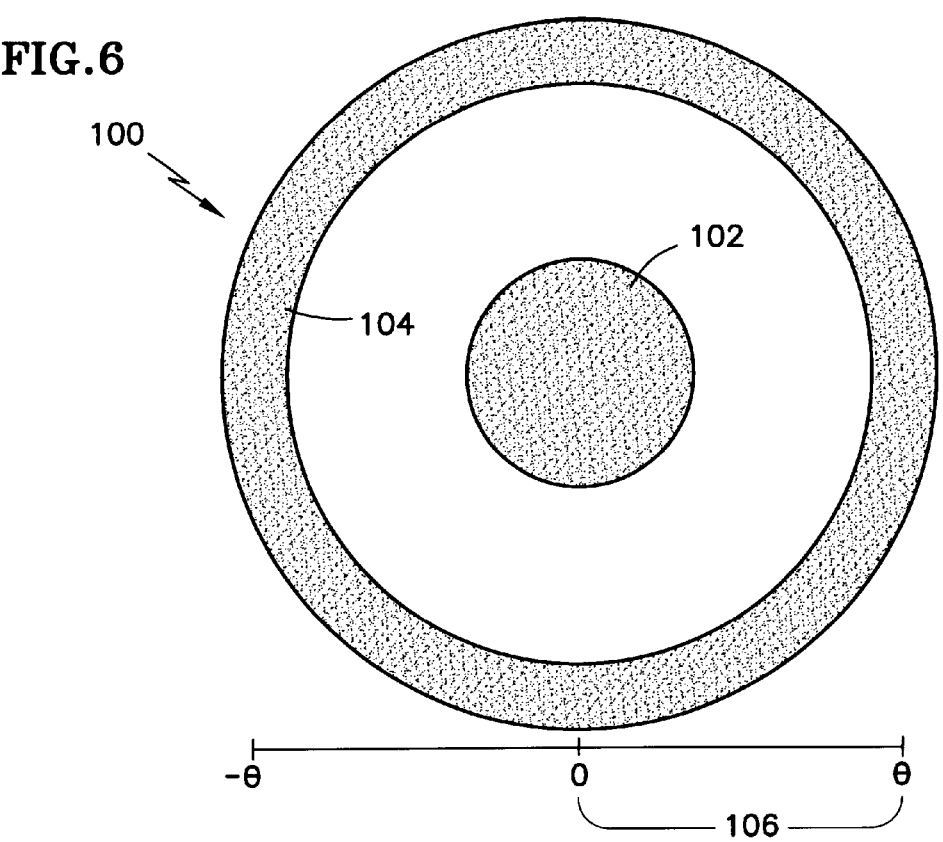
FIG. 6 is a cross-sectional view of the of the emission pattern of the energy beam of FIG. 5 taken along section line 6—6.

Referring to FIG. 6, a cross-sectional view of the emission pattern produced by each curtain beam 100, taken along section line 6—6 of FIG. 5, is shown. The primary beam component 102 is of high intensity and concentrated within a narrow angle from the center of the emission pattern 100. The halo component 104 consists of a less intense ring of energy of limited width, concentrated at a set angle 106 from the center of the emission pattern 100.

Figure 7:
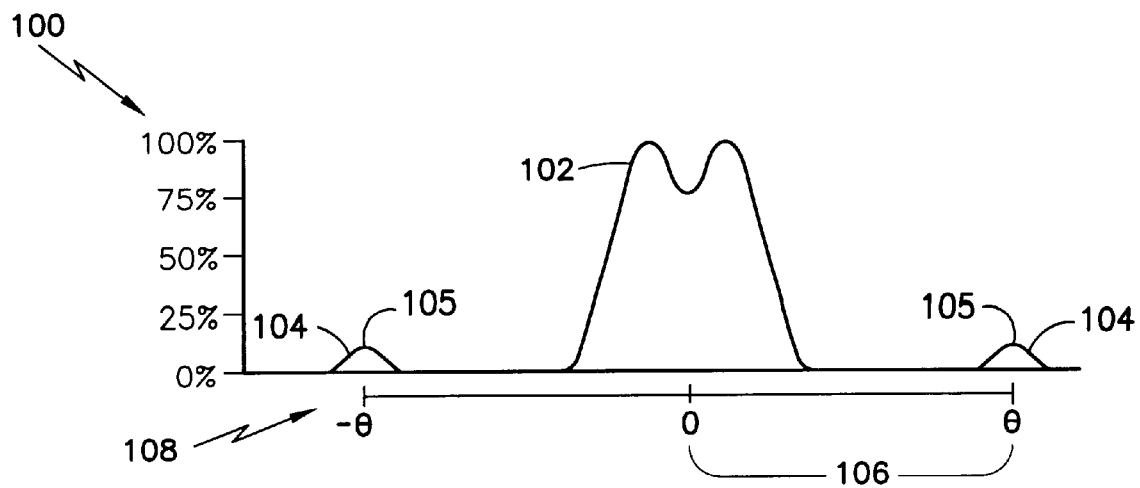
FIG. 7 is a graph of percent beam energy intensity vs. transmission angle of FIG. 6.

Referring to FIG. 7, a graph 108 of percent beam energy vs. transmission angle 106 shows the relative intensities of the primary component 102 and the halo component 104 through the cross-section of curtain beam 100. Note that the relative intensity of the primary beam component 102 is much higher than that of the halo component 104. Note also that the halo component 104 has a peak 105 in the center of the halo pattern, at the set angle 106, while the primary component 102 has no definitive peak.

Figure 8:
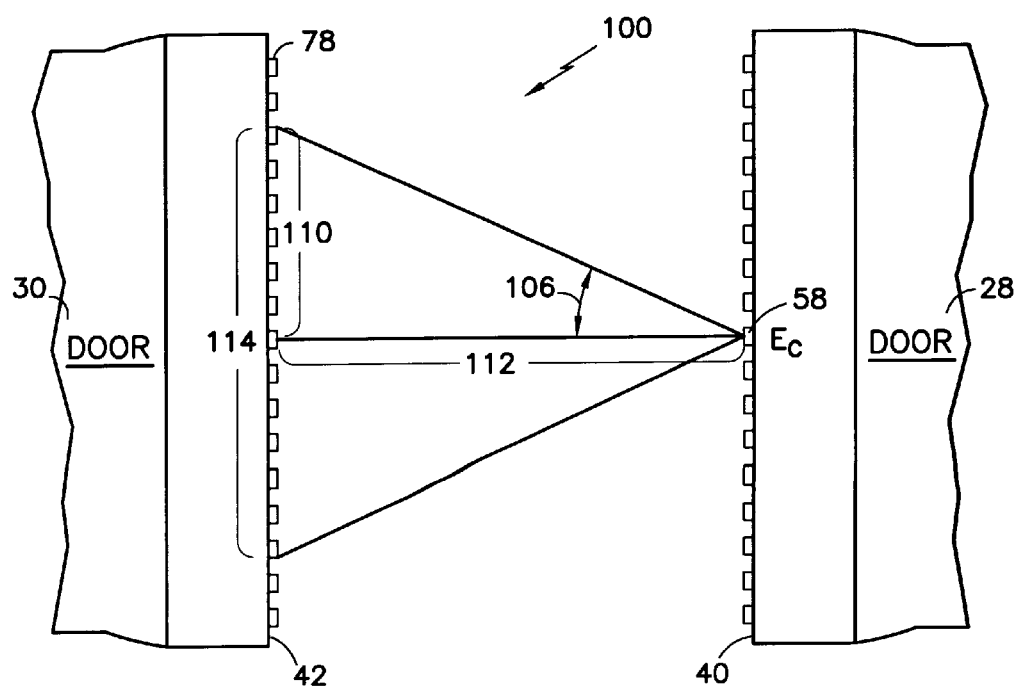
FIG. 8 is a schematic view of the energy beam of FIG. 4.

Referring to FIG. 8, an exemplary embodiment of the method to determine relative elevator door 28, 30 positions via optical geometry is shown. In practice, at any particular door position, the peak 105 of the halo component 104, for any particular curtain beam 100, will strike the receiver stack 42 at some distance 112 from the center curtain receiver 110, for that beam 100. As the elevator doors 28, 30 move closer together, the distance 112 from the center of the beam 100 to the peak 105 of the halo component 104 will decrease. This distance is a direct indication of relative door position.

In practice, an individual curtain emitter 58 is enabled to produce a beam of energy 100. Then, a range, i.e., plurality, of curtain receivers 78 are scanned, individually, to determine the amount of energy each receiver 78 is receiving. The range of receivers 78 scanned is centered on the curtain beam 100 being produced, and extends far enough above and below the center of the beam 100, to ensure that the halo component 104 will fall within the range, when it is at its greatest expected diameter, i.e., the doors are fully open. The resulting intensity data should produce a pattern similar to that shown in FIG. 7. The relative distance between the doors 112 can be calculated, knowing the diameter 114 of the halo component 104 and the angle 106 of the peak 105 of the halo component 104 from the center of the beam 100, as follows:

$$h = d/2 \tan \theta$$

Where:

h=the relative distance 112 between the doors;

d=diameter 114 of the halo component 104; and

θ=the angle 106 of the peak 105 of the halo component 104 to the center of the beam 100.

Alternatively, the diameter d may be replaced by the vertical distance 110 from the center of the beam 100 to the intersection of the halo component 104 with the receivers 78 as follows:

$h = r \tan \theta$ where h=the vertical distance 110.

The diameter 114 of the halo component 104 is measured from the intersection of the peak 105 of the halo component 104 and the receiver array 42 above and below the beam 100 center. The diameter 114 is determined as follows:

1. Create the second derivative of the data set acquired when sampling the range of receivers above and below the center of the curtain beam 100. The energy value received by each receiver in the range is converted using the following formula:

for $i=n-R$ to $n-1$: $DIFF_i = E_i - 2E_{i+1} + E_{i+2}$ for $i=n+1$ to $n+R$: $DIFF_i = E_i - 2E_{i-1} + E_{i-2}$ Where:
   i=the index of the receiver whose energy reading is being converted;
   n=the index of the receiver in the center of the beam;
   R=the maximum index from center of the sampled receiver range; and
   DIFF=the approximate second derivative of the data value.

2. Determine the upper negative to positive slope inflection point ($INFLEC_u$) as follows:
   Starting at $i=n-2$:

Determine $j_u$ where:

$DIFF_{jU} \leq 0$

And:

$DIFF_{jU-1} > 0$

Then interpolate between $j_u$ and $j_{u-1}$ to determine the estimated inflection point, as follows:

$$INFLEC_U = ABS\left[ j_U - \left( \frac{0 - DIFF_{jU}}{DIFF_{jU-1} - DIFF_{jU}} \right) \right]$$

3. Determine the lower negative to positive slope inflection point ($INFLEC_L$) as follows:
   Starting at $i=n+2$:

Determine $j_L$ where:

$DIFF_{jL} \leq 0$

And:

$DIFF_{jL+1} > 0$

Then interpolate between $j_L$ and $j_{L+1}$ to determine the estimated inflection point, as follows:

$$INFLEC_L = ABS\left[ j_L + \left( \frac{0 - DIFF_{jL}}{DIFF_{jL+1} - DIFF_{jL}} \right) \right]$$

4. The diameter is then determined by the following:

$d = x(INFLEC_u + INFLEC_L)$

Where:

d=diameter 114 of the halo component 104;
x=distance between individual curtain receivers;
$INFLEC_U$=interpolated index of the intersection of the halo component and the receiver stack above the center of the curtain beam; and
$INFLEC_L$=interpolated index of the intersection of the halo component and the receiver stack below the center of the curtain beam.

In an alternate method of distance measurement, several curtain beams can be sampled, and their intensity values averaged, before performing the distance calculations. This method provides for the cancellation of any variation in individual curtain beams, caused by variation in transmitted beam angles due to emitter/lens alignment.

In the best mode embodiment of the present invention, the relative position of the doors is determined, in real time, as the doors are opening and closing. Three-dimensional target detection optimization is accomplished, based directly upon this geometrically determined position. In this embodiment of the present invention, compensation for environmental variables and component aging effects are automatic and essentially instantaneous.

In an alternate embodiment of the present invention, during system initialization, the geometric position measurements are performed at two points, when the elevator doors 28, 30 are fully open, and when the elevator doors 28, 30 are fully closed. Since, as the intensity of the curtain beams 100 increases as the doors close and decreases as the doors open, curtain intensity values can be used to indicate relative door positions. The curtain intensity values can be calibrated to actual door positions by correlating the curtain intensity values at the fully open and fully closed positions with their optically measured distances. Then, the curtain beam intensity values corresponding to door positions within the two end positions can be interpolated by applying their respective curtain intensity values to a known curtain beam intensity response curve. Compensation for environmental variables and component aging effects can be accomplished by periodically redetermining the curtain intensity values at the two end positions and shifting the interpolated door position curtain beam intensity values to match, relative to the curtain beam intensity response curve. In this way, the geometric calibration algorithm, which can take significant sampling and processing time, need only be applied during system initialization, which may significantly increase system response time during normal operation.

While the preferred embodiments of the invention have been herein described, it is understood that modification and variation may be made without departing from the scope of the presently claimed invention.

What is claimed is:

1. A method of detecting distance between a first plurality of emitters and a first plurality of receivers, wherein the emitters emit energy beams having an emission pattern comprising a primary beam component emitted in a narrow angle from a center of the pattern and a halo component emitted in a predetermined wide angle from the center of the pattern, the method comprising:
   emitting an energy beam from an emitter;
   sampling the halo component of the energy beam with the plurality of receivers to provide a set of energy signals indicative of intensity of the halo component energy sampled;
   determining, from the set of energy signals, a vertical distance from the center of the pattern to an intersection of the halo component with the first plurality of receivers; and calculating the distance between the first plurality of emitters and receivers utilizing the predetermined wide angle and the vertical distance.

2. The method of claim 1 further comprising:

emitting an energy beam from each of the first plurality of emitters;

sampling each halo component with the first plurality of receivers to provide a plurality of sets of energy signals indicative of intensity of the energy sampled;

determining, from the plurality of sets of energy signals, a plurality of vertical distances from the center of each pattern to an intersection of each pattern's halo component with the first plurality of receivers; and calculating the distance between the first plurality of emitters and receivers utilizing the predetermined wide angles of the halo components and the plurality of vertical distances.

3. The method of claim 2 wherein calculating further comprises:

averaging the predetermined wide angles to provide a mean wide angle;

averaging the vertical distances to provide a mean vertical distance; and calculating the distance between the first plurality of emitters and receivers from the mean wide angle and the mean vertical distance.

4. The method of claim 1 wherein determining a vertical distance further comprises determining a vertical distance from the center of the pattern to an intersection of peak halo component energy with the first plurality of receivers.

5. The method of claim 4 further comprising:

sampling the halo component energy above and below the center of the pattern with the first plurality of receivers;

determining a diameter of the peak halo component energy; and calculating the distance between the first plurality of emitters and receivers using the formula:

$$h=d/2 (\tan \theta)$$

where, h is the distance between the first plurality of emitters and receivers, d is the diameter of the peak energy of the halo component, and θ is the predetermined wide angle.

6. The method of claim 1 wherein the first plurality of emitters and receivers further comprise curtain energy emitters and receivers mounted on opposing sides of an elevator door system.

7. The method of claim 6 further comprising:

detecting distance between the first plurality of energy emitters and receivers when the door system is in the fully open and fully closed positions;

measuring intensity of the energy beam from the emitter when the door system is in the fully open and fully closed positions;

calibrating a known beam intensity response curve with the detected distances and the measured intensities at the fully open and fully closed positions; and interpolating distances between the first plurality of emitters and receivers when the door system is in other than the fully open and fully closed positions by applying measured beam intensity values to the calibrated response curve.

8. The method of claim 6 wherein the elevator door system further comprises one of a center opening door and a side opening door.

9. The method of claim 1 further comprising:

emitting energy from a plurality of three dimensional energy emitters in a predetermined transmitting angle at an object;

sensing the energy reflected from the object with a plurality of three dimensional receivers in a predetermined receiving angle;

defining a zone of detection, within which the object is detected, by the transmitting angle and the receiving angle; and modifying the zone of detection to optimize an ability to detect actual objects and to reject false objects as the distance between the first plurality of emitters and receivers changes.

10. The method of claim 9 wherein modifying further comprises either one of:

modifying the way energy emitted from the three dimensional emitters is produced;

modifying the amount of energy emitted from the three dimensional emitters; and modifying the way the energy sensed by the three dimensional receivers is interpreted.

11. An elevator door system comprising:

an emitter of a first plurality of emitters, wherein the emitters emit energy beams having an emission pattern comprising a primary beam component emitted in a narrow angle from a center of the pattern, and a halo component emitted in a predetermined wide angle from the center of the pattern;

a first plurality of receivers for sampling the halo component of the emitter to provide a set of energy signals indicative of intensity of the halo component energy sampled; and a controller responsive to the energy signals and having memory for storing signals including program signals defining an executable program for, determining, from the set of energy signals, a vertical distance from the center of the pattern to an intersection of the halo component with the plurality of receivers, and calculating the distance between the first plurality of emitters and receivers utilizing the predetermined wide angle and the vertical distance.

12. The elevator door system of claim 11 further comprising:

the first plurality of emitters each emitting an energy beam;

the first plurality of receivers sampling each halo component to provide a plurality of sets of energy signals indicative of intensity of the halo component energy sampled; and the executable program for, determining, from the plurality of sets of energy signals, a plurality of vertical distances from the center of each pattern to an intersection of each pattern's halo component with the first plurality of receivers; and calculating the distance between the first plurality of emitters and receivers utilizing the predetermined wide angle of each halo component and the plurality of vertical distances.

13. The elevator door system of claim 12 wherein the executable program further comprises:

averaging the predetermined wide angles to provide a mean wide angle;

averaging the vertical distances to provide a mean vertical distance; and calculating the distance between the first plurality of emitters and receivers utilizing the mean wide angle and the mean vertical distance.

14. The elevator door system of claim 11 wherein the executable program further comprises determining a vertical distance from the center of the pattern to an intersection of peak halo component energy with the plurality of receivers.

15. The elevator door system of claim 14 further comprising:

the first plurality of receivers sampling the halo component energy above and below the center of the pattern; and the executable program for,
  determining a diameter of the peak halo component energy, and
  calculating the distance between the first plurality of emitters and receivers using the formula $h = d/2(\tan \theta)$ where,
  h is the distance between the first plurality of emitters and receivers,
  d is the diameter of the peak energy of the halo component, and
  θ is the predetermined wide angle.

16. The elevator door system of claim 11 wherein the first plurality of emitters and receivers further comprise curtain energy emitters and receivers mounted on opposing sides of the elevator door system.

17. The elevator door system of claim 14 wherein the elevator door system further comprises one of a center opening door and a side opening door.

18. The elevator door system of claim 16 wherein the executable program further comprises:

detecting distance between the first plurality of energy emitters and receives when the door system is in the fully open and fully closed positions;

measuring intensity of the energy beam from the emitter when the door system is in the fully open and fully closed positions;

calibrating a known beam intensity response curve with the detected distances and the measured intensities at the fully open and fully closed positions; and interpolating distances between the first plurality of emitters and receivers when the door system is in other than the fully open and fully closed positions by applying measured beam intensity values to the calibrated response curve.

19. The elevator door system of claim 11 further comprising:

a plurality of three dimensional energy emitters which emit energy in a predetermined transmitting angle at an object;

a plurality of three dimensional receivers which sense the energy reflected from the object within a predetermined receiving angle;

a zone of detection within which the object is detected, the zone bounded by the transmitting angle, the receiving angle and the distance between the first plurality of emitters and receivers; and the executable program for modifying the zone of detection to optimize an ability to detect actual objects and to reject false objects as the distance between the first plurality of emitters and receivers changes.

20. The elevator door system of claim 19 wherein the executable program further comprises either one of:

modifying the way energy emitted from the three dimensional emitters is produced;

modifying the amount of energy emitted from the three dimensional emitters; and modifying the way the energy sensed by the three dimensional receivers is interpreted.

* * * * *